(12) United States Patent
Suzuki et al.

(10) Patent No.: US 7,479,958 B1
(45) Date of Patent: Jan. 20, 2009

(54) IMAGE GENERATING DEVICE AND IMAGE GENERATING METHOD

(75) Inventors: Yu Suzuki, Tokyo (JP); Takeshi Hirai, Tokyo (JP); Tomoo Kondou, Yokohama (JP); Kazunori Masuda, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/622,536

(22) PCT Filed: Dec. 20, 1999

(86) PCT No.: PCT/JP99/07154

§ 371 (c)(1),
(2), (4) Date: Dec. 7, 2000

(87) PCT Pub. No.: WO00/38116

PCT Pub. Date: Jun. 29, 2000

(30) Foreign Application Priority Data

Dec. 19, 1998 (JP) .................................. 10-375926

(51) Int. Cl.
*G06T 17/00* (2006.01)
*G06T 15/00* (2006.01)
*G06T 15/40* (2006.01)
*G06F 3/048* (2006.01)

(52) U.S. Cl. ..................... 345/420; 345/421; 345/473; 715/788

(58) Field of Classification Search ................. 345/418, 345/419, 421, 473, 619, 420; 434/79, 80; 715/788
See application file for complete search history.

(56) References Cited

U.S. PATENT DOCUMENTS 5,601,431 A * 2/1997 Howard ....................... 434/79

(Continued)

FOREIGN PATENT DOCUMENTS

JP 07-296030 11/1995

(Continued)

OTHER PUBLICATIONS

Hon Wai Chun; Ming-Kit Lai, E.; "Intelligent critic system for architectural design", IEEE Transactions on Knowledge and Data Engineering, vol. 9, Issue 4, Jul.-Aug. 1997, pp. 625-639.*

(Continued)

*Primary Examiner*—Ulka Chauhan
*Assistant Examiner*—Roberta Prendergast
(74) *Attorney, Agent, or Firm*—Finnegan, Henderson, Farabow, Garrett & Dunner, L.L.P.

(57) ABSTRACT

An image generating device for forming a behind object prepared with polygon data as a part of the background of a virtual three-dimensional space and generating images of the movement of a character object prepared with polygon data in this virtual three-dimensional space. A visual field seen from a viewpoint is operated, and behind objects OTa, OTb, and OTc positioned within this visual field and observable from the viewpoint are specified. Moreover, judged is whether it is the specific condition wherein the character object OTch is within the visual field and positioned in the space closer to the viewpoint side than the specified behind object. The character object OTch is incorporated as the object of display only when it is judged as being this specific condition.

13 Claims, 14 Drawing Sheets

U.S. PATENT DOCUMENTS

| | | | | |
|---|---|---|---|---|
| 5,712,964 | A * | 1/1998 | Kamada et al. | 345/418 |
| 5,796,395 | A * | 8/1998 | de Hond | 715/751 |
| 5,825,365 | A * | 10/1998 | Hirota et al. | 345/678 |
| 5,870,101 | A * | 2/1999 | Murata et al. | 345/584 |
| 5,923,330 | A * | 7/1999 | Tarlton et al. | 345/419 |
| 5,937,081 | A * | 8/1999 | O'Brill et al. | 382/111 |
| 5,977,978 | A * | 11/1999 | Carey et al. | 345/419 |
| 6,016,147 | A * | 1/2000 | Gantt | 345/420 |
| 6,058,397 | A * | 5/2000 | Barrus et al. | 707/104.1 |
| 6,084,590 | A * | 7/2000 | Robotham et al. | 345/419 |
| 6,115,045 | A * | 9/2000 | Miyauchi | 345/418 |
| 6,738,059 | B1 * | 5/2004 | Yoshinaga et al. | 345/419 |

FOREIGN PATENT DOCUMENTS

| | | |
|---|---|---|
| JP | 08-006989 | 1/1996 |
| JP | 08-161526 | 6/1996 |
| JP | 9-317206 | 12/1997 |

OTHER PUBLICATIONS

Fung, W.L.; Chun, H.W.; "Representing spatial knowledge in design", TENCON '92. Technology Enabling Tomorrow : Computers, Communications and Automation towards the 21st Century, 1992 IEEE Region 10 International Conference, vol. 2, pp. 700-704.*

Armando, A.; Pecchiari, P.; "NALIG; A CAD system for interior design with high level interaction capabilities", Proceedings of Fifth International Conference on Tools with Artificial Intelligence, Nov. 1993, pp. 446-447.*

Gudivada, V.N.; Jung, G.S.; "Spatial knowledge representation and retrieval in 3-D image databases", Proceedings of the International Conference on Multimedia Computing and Systems, May 1995, pp. 90-97.*

"Alice: rapid prototyping for virtual reality", Lawrence J. Rosenblum, editor, IEEE Computer Graphics and Applications, vol. 15, Issue 3, May 1995, pp. 8-11.*

Sauce et al., "A Knowledge-Based System for Construction-Site Organization", Microcomputers in Civil Engineering, vol. 10, No. 3, pp. 187-197, 1995.*

Guinchiglia, E.; Armando, A.; Traverso, P.; Cimatti, A.; "Visual representation of natural language scene descriptions", IEEE Transactions on Systems, Man and Cybernetics, Part B, vol. 26, Issue 4, Aug. 1996, pp. 575-589.*

Rau-Chaplin et ah, "Graphics Support for a Word-Wide-Web Based Architectural Design Service", Computer Networks and ISND Systems, vol. 29, No. 14, pp. 1611-1623, Oct. 1, 1997.*

Gudivada, V. N., Bhuyan, J., and Adusumilli, R.; "A retrieval technique for virtual reality databases", Proceedings of the 1997 ACM Symposium on Applied Computing, B. Bryant, J. Carroll, J. Hightower, and K. M. George, Eds., ACM Press, NY, NY, pp. 328-333.*

Heng Li; Love, P.E.D.; "Visualization of building interior design to reduce rework", Proceedings of 1998 IEEE Conference on Information Visualization, Jul. 1998, pp. 187-191.*

Lewis et al., "Generation of 3D Building Models from 2D Architectural Plans", Computer-Aided Design, vol. 30, No. 10, pp. 765-779, Sep. 1998.*

Building System Device for Architechural/Living Space Furniture Layout and Related Data Using the Internet, Translation of Japan Patent Document No. 10-97558, published Apr. 1998.*

Barrus, J.W.; Waters, R.C.; Anderson, D.B.; "Locales: supporting large multiuser virtual environments", IEEE Computer Graphics and Applications, vol. 16, Issue 6, Nov. 1996, pp. 50-57.*

Pearce, et al., 1997, "Narrative environments (panel): virtual reality as a storytelling medium", Proceedings of the 24th Annual Conference on Computer Graphics and interactive Techniques, International Conference on Computer Graphics and Interactive Techniques, ACM Press/Addison-Wesley Publishing Co., NY, NY, pp. 440-441.*

Shukan Famitsu, Weekly Game Magazine, Issue of Aug. 7, 1998, (Japan), Kabushiki Kaisha Asuki, pp. 21-23 (1998).

Hansong Zhang, Effective Occlusion Culling for the Interactive Display of Arbitrary Models, PhD Thesis, Department of Computer Science, University of North Carolina, Jul. 1998.

English Translation of Notice Requesting Submission of Opinion mailed on Feb. 7, 2006, from Korean Patent Office In Korean Patent Application No. 10-2000-7009113.

English Translation of Notice Requesting Submission of Opinion mailed on Feb. 7, 2006, from Korean Patent Office In Korean Patent Application No. 10-2004-7020704.

* cited by examiner

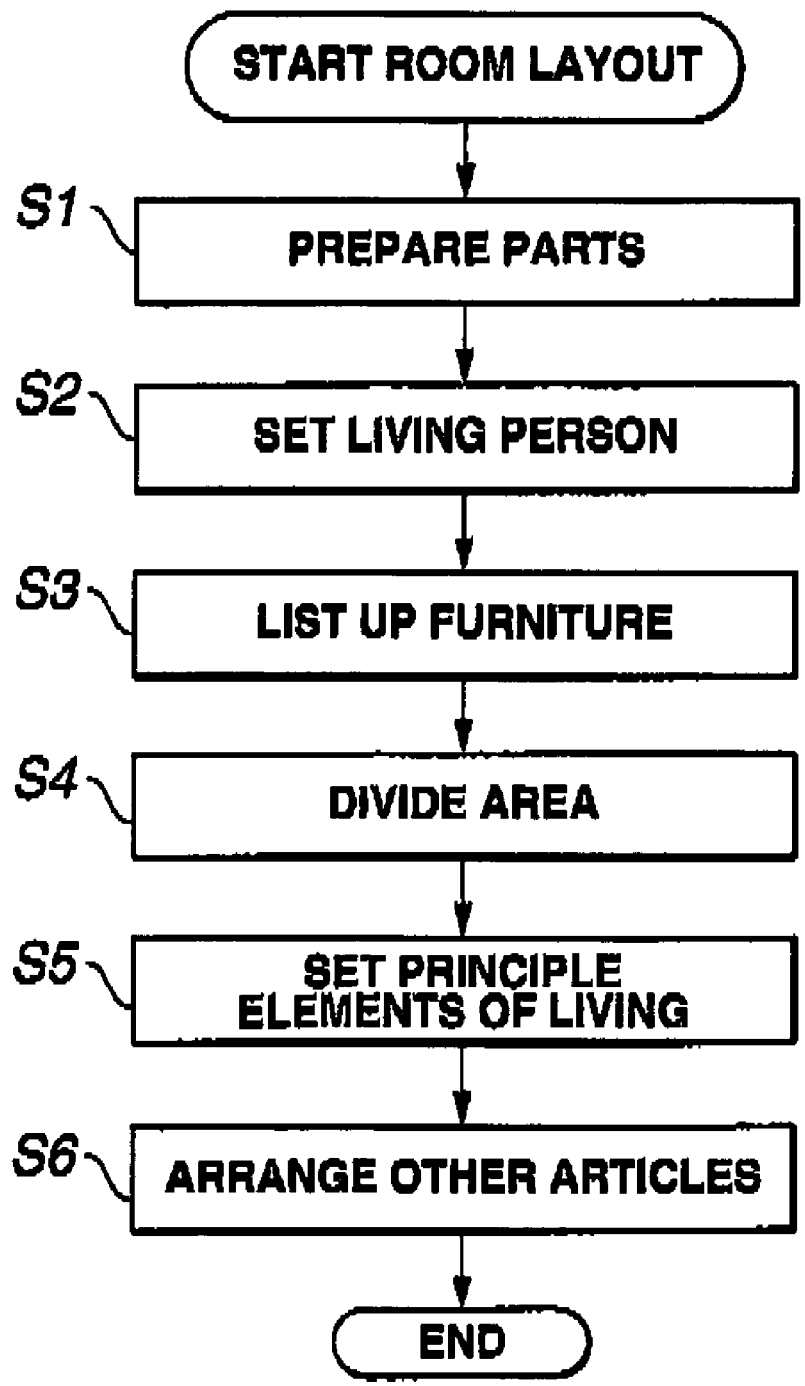

DOOR

WINDOW
(AREA DIVISION)

(ARRANGEMENT DIRECTION OF FURNITURE)

FIG.5

(MODE RATIO TABLE)

| RATIO MODE | LENGTH OF AUTO MODE | LENGTH OF MANUAL MODE | DIFFICULTY |
|---|---|---|---|
| A | SHORT ($T_1$) | LONG ($T_2$) | HARD |
| B | MEDIUM ($T_0$) | MEDIUM ($T_0$) | INTERMEDIATE |
| C | LONG ($T_2$) | SHORT ($T_1$) | EASY |

$$\begin{pmatrix} T_1+T_2=T_0+T_0=\text{FIXED} \\ T_1<T_2 \end{pmatrix}$$

FIG.8

| DATA | TIME | SKY(BACKGROUND) | WEATHER | DEGREE OF WEATHER |
|---|---|---|---|---|
| JANUARY 1 | 0:00 | NIGHT/CLOUDY | CLOUDY | - |
| | 1:00 | NIGHT/CLOUDY | CLOUDY | - |
| | 2:00 | NIGHT/CLOUDY | RAIN | LIGHT RAIN |
| | 3:00 | NIGHT/CLOUDY | RAIN | LIGHT RAIN |
| | 4:00 | NIGHT/CLOUDY | RAIN | MEDIUM RAIN |
| | 5:00 | NIGHT/CLOUDY | SLEET | MEDIUM SLEET |
| | 6:00 | DAWN/CLOUDY | SNOW | MEDIUM SNOW |
| | 7:00 | DAWN/CLOUDY | SNOW | MEDIUM SNOW |
| | 8:00 | NOON/CLOUDY | SNOW | MEDIUM SNOW |
| | 9:00 | NOON/CLOUDY | SNOW | HEAVY SNOW |
| | 10:00 | NOON/CLOUDY | SNOW | HEAVY SNOW |
| | 11:00 | NOON/CLOUDY | SLEET | HEAVY SLEET |
| | 12:00 | NOON/CLOUDY | RAIN | HEAVY RAIN |
| | 13:00 | NOON/CLOUDY | RAIN | HEAVY RAIN |
| | 14:00 | NOON/CLOUDY | RAIN | HEAVY RAIN |
| | 15:00 | NOON/CLOUDY | RAIN | MEDIUM RAIN |
| | 16:00 | EVENING/CLOUDY | RAIN | MEDIUM RAIN |
| | 17:00 | EVENING/CLOUDY | RAIN | LIGHT RAIN |
| | 18:00 | NIGHT/CLOUDY | RAIN | LIGHT RAIN |
| | 19:00 | NIGHT/CLOUDY | CLOUDY | - |
| | 20:00 | NIGHT/CLOUDY | CLOUDY | - |
| | 21:00 | NIGHT/CLOUDY | CLOUDY | - |
| | 22:00 | NIGHT/CLEAR | CLEAR | - |
| | 23:00 | NIGHT/CLEAR | CLEAR | - |
| JANUARY 2 | 0:00 | NIGHT/CLEAR | CLEAR | - |
| | 1:00 | NIGHT/CLEAR | CLEAR | - |
| | 2:00 | NIGHT/CLEAR | CLEAR | - |
| | 3:00 | NIGHT/CLEAR | FOGGY | LIGHT FOG |
| | 4:00 | NIGHT/CLEAR | FOGGY | LIGHT FOG |
| | 5:00 | NIGHT/CLEAR | FOGGY | DENSE FOG |
| | 6:00 | DAWN/CLEAR | FOGGY | DENSE FOG |
| | 7:00 | DAWN/CLEAR | FOGGY | LIGHT FOG |
| | 8:00 | NOON/CLEAR | FOGGY | LIGHT FOG |
| | 9:00 | NOON/CLEAR | CLEAR | - |
| | 10:00 | NOON/CLEAR | CLEAR | - |
| | 11:00 | NOON/CLEAR | CLEAR | - |
| | 12:00 | NOON/CLEAR | CLEAR | SUNNY |
| | 13:00 | NOON/CLEAR | CLEAR | SUNNY |
| | 14:00 | NOON/CLEAR | CLEAR | SUNNY |

FIG.9

| 4BIT | 4BIT | 8BIT |
|---|---|---|
| SKY (BACKGROUND) | WEATHER | DEGREE OF WEATHER |

IMAGE GENERATING DEVICE AND IMAGE GENERATING METHOD

TECHNICAL FIELD

The present invention relates to an image generating device and image generating method, and particularly to an image generating device and image generating method suitable for role playing games (RPG) played interactively with players pursuant to the progress of a story in a virtual three-dimensional space.

BACKGROUND ART

Pursuant to the recent developments in computer graphics technology, simulation devices and game devices have become widely popular for both business and domestic use. As one genre of this game device, there is a role playing game (hereinafter referred to as "RPG") wherein a story is commenced in a virtual three-dimensional space (also referred to as a game space), a character simulating the player plays a prescribed game at various important points in the story and, in accordance with the game results, progresses the game while changing the game development for each such occasion. RPGs have gained popularity for presenting different effects than the other more competition games or battle games.

Game devices conducting such RPGs perform the various image processing described below in order to secure the game amusement and conduct vast loads of game operations.

As the first processing, there is a method of changing the color and appearance of the sky in accordance with the time period the player is to play the game. This processing, for example, is conducted by the CPU inside the game device reading image data or parameter representing the background sky upon referring to a table based on the clock value of the internal clock, and displaying this read image data, or, displaying the image data corresponding to the read parameter. Thereby, attempted is the creation of a game space as real as possible in order to evoke the interest of players.

As the second processing, in the case of a game device for conducting RPGs, a player receives operational information at important points (strategic positions) during the game development and, for example, interactively implements an action game (manual mode) on the one hand, and the story for connecting such important points are compulsorily advanced (auto mode) by the CPU since it is necessary to advance the story in view of the characteristics of RPGs. Thereby, it is possible to secure the storyline in consideration of the game being an RPG.

As the third processing, with respect to the image display of the game device, generally, objects are formed of polygons and displayed. Thus, more the polygons, increased is the operational load for operating the displayed state, and the CPU processing will become heavy. Here, generally, objects outside the display range of the monitor; that is, objects positioned on the outside of the visual field range seen from a virtual camera viewpoint on the game space, are not displayed. Moreover, upon a three-dimensional (polygon) display, to objects positioned afar exceeding a prescribed distance on the screen, clipping processing (far-clipping processing) for non-operation of such display data is performed. Furthermore, processing using the z-value sorting method for not displaying a polygon behind a certain polygon when seen from a viewpoint; i.e., shadow-face processing, is implemented in polygon units that form the object.

As the fourth processing, there is a process of laying out rooms (partitioned space) inside a building (house, warehouse, remains of a building, etc.), which is often required upon providing the game environment of RPGs. With respect to this layout, which object is arranged at which position in the room is determined, all rooms are previously laid out, and such layout data is stored in the memory. Further, upon creating polygons of maps (caves, tunnels) for the character to move in games such as an RPG, shapes were previously set in the respective polygon units, and stored in the memory as polygon data.

Although a certain degree of effect can be obtained in reply to the needs of wanting to provide images full of reality and ambience, and securing a certain game amusement pursuant to the various image processing described above, it can in no way be said that this was sufficient.

For example, with the aforementioned first image processing that changes the color and appearance of the sky in accordance with the time period, it is possible to provide the player with a sense of time, such as daytime or evening, to a certain degree. Nevertheless, the natural environment of the outside is not determined only with the control of the display mode of the sky, and demanded is a display of a more realistic natural environment.

In the case of the second image processing, the ratio of the storyline (auto mode) as an RPG and the action (manual mode) for playing an action game is determined in advance. Thus, it lacks versatility in terms of the player not being able to change between the modes in accordance with his/her feelings at such time, and it is also unadaptable in terms of the game device provider not being able to, after manufacture thereof, ship the game upon changing the ratio in accordance with the characteristics of the market. The length of the game processed in real time between the player; i.e., the manual mode, is one factor that reflects on the difficulty of the game. Therefore, it also means that there will be less selectivity for setting the difficulty of the game.

With only the clipping and shadow-face processing of polygons according to the third image processing, the operational load pursuant to the judgment of the display/non-display is still heavy, and there are many demands for the improvement of high-speed processing by lightening the operational load.

For instance, in a role-playing game, presume a scene where Godzilla strays about in an area having a number of towering buildings and it is to fight the player. The respective buildings are objects created with polygon data and treated as a part of the background, and Godzilla is also treated as one character object created with polygon data. In this scene, if Godzilla is positioned in front of the buildings, performing rendering processing for displaying Godzilla with the buildings as the background is natural, but it is not necessary to display Godzilla when it is completely hidden behind a building. Nonetheless, with a conventional shadow-face device, the Z value must be obtained in polygon units with the Z-sorting method regarding the hidden Godzilla and the buildings, and compared thereafter. This Z value comparison in polygon units among objects considerably increases the operational load. When the load is heavy pursuant to the shadow-face processing as described above, unless the processing speed of the CPU itself is increased, the operational capacity which may be transferred to other game processing will be reduced. Further, even if the rendering processing can be lightened with the Z-sorting method, the geometry processing at the previous stage will still not be lightened, and sufficient image display cannot be expected with only the above.

In the case of the fourth image processing, the layout of the rooms requires a vast operational load. Thus, adopted were methods such as not allowing the entrance into a room where no event occurs or seeking simplification of the operation by making the layout of the respective rooms the same. This, however, causes an extremely unnatural feeling to the player. Although it would be possible to use similar patterns for the layout process to a certain degree, if the environment of the rooms is similar, rooms resembling each other will be created. This will be one cause for a player losing interest in the game. Upon preparing a map, the larger the map, the operational load necessary for such preparation will be vast as a matter of course, and it is further necessary to secure a memory with a large storage size. If the memory or transmission path is a disk medium or telephone circuit having a comparatively slow reading speed, or if the storage size of the memory for storing the read data is small, the reading time and reading frequency will increase, and this increase in processing gives dissatisfaction to the players.

The present invention was devised in view of the aforementioned circumstances encountered by the prior art, and the principle object thereof is to provide a game capable of reducing the operational load for judging the display/non-display of the object, is full of realism and ambience, and which enables variations in the difficulty of the game in accordance with the preference of the player.

Particularly, the first concrete object is to sharply reduce the operational load consequent upon the display/non-display of an object with simple processing in consideration of the position relationship from the viewpoint from the object and the background.

Moreover, the second concrete object is to enable layouts and preparations thereof utilizing the analog sensitiveness of human beings as well as simultaneously substantially reducing the operational load in games requiring the preparation of layouts of rooms and maps.

Further, the third concrete object is to provide a game having improved reality and ambience by precisely expressing the time changes of the outside natural environment.

In addition, the fourth concrete object is to enable changes in the difficulty of RPGs in accordance with the player's preference or the market situation at the time of shipment with respect to RPGs.

DISCLOSURE OF THE INVENTION

In order to achieve the aforementioned objects, the present invention is structured as follows.

The first invention is an image generating device for forming a behind object prepared with polygon data as a part of the background of a virtual three-dimensional space and generating images of movements of a character object prepared with polygon data in this virtual three-dimensional space by capturing it from a movable viewpoint, characterized in comprising: control means for incorporating as the object of display a character object within a visual field seen from the viewpoint only when the character object is positioned in the space near the viewpoint in comparison to the behind object seen from the viewpoint.

According to this structure, the control means comprises: visual field operation means for operating the visual field seen from the viewpoint; specifying means for specifying the behind object positioned within the visual field and observable from the viewpoint; judging means for judging the specific condition of the character object within the visual field and positioned in the space closer to the viewpoint side than the behind object specified with the specifying means; and display objectifying means for incorporating the character object as the object of display only when the specific condition is judged by the judging means.

Preferably, the specifying means comprises; modeling means for modeling the behind object as a behind object model of a certain shape; Z value operation means for operating the Z value between the behind object model and the viewpoint; a buffer corresponding to a plurality of areas of a simulatively divided display screen; searching means for searching the behind object model from the viewpoint via one line worth of the respective areas among the plurality of areas; and Z value storage means for storing the Z value of the behind object model initially searched by the searching means; and the judging means comprises: a separate modeling means for modeling the character object as a model of a certain shape; a separate Z value operation means for operating the Z value between the character object model and the viewpoint; and calculation means for calculating the specific condition upon comparing the Z value of the character object model and the Z value stored in the buffer.

Here, the modeling means is means for modeling a spherical model, which is defined by a representative point of a solid body forming the behind model and a radius corresponding to the distance from the representative point to the edge of the model, as the model of a certain shape; and the separate modeling means is means for modeling a spherical model, which is defined by a representative point of a solid body forming the character model and a radius corresponding to the distance from the representative point to the edge of the model, as the model of a certain shape.

Moreover, it is preferable that the simulative areas are areas dividing the display screen in a checkerboard shape, and at least one line worth of area is formed with one row worth of area crossing the checkerboard-shaped area in the horizontal direction. The aforementioned at least one row worth of area, for example, is one line worth of area approximately corresponding to the eye level seen from the viewpoint. More preferably, the Z value storage means is means for storing as the Z value the default value corresponding to a remote distance set in advance to the area to which the behind object model could not be searched by the searching means.

For example, the behind object may be arranged in a plurality in the virtual three-dimensional space, and the behind object may be an artificial structure in an actual space.

The second invention is an image generating method for forming a behind object prepared with polygon data as a part of the background of a virtual three-dimensional space and generating images of movements of a character object prepared with polygon data in this virtual three-dimensional space by capturing it from a movable viewpoint, characterized in comprising the steps of: operating the visual field seen from the viewpoint; specifying the behind object positioned within the visual field and observable from the viewpoint; judging the specific condition of the character object within the visual field and positioned in the space closer to the viewpoint side than the behind object specified with the specifying means; and incorporating the character object as the object of display only when the specific condition is judged by the judging means.

The third invention is an image generating device for generating images with the addition of a virtual weather environment in the virtual three-dimensional space; characterized in comprising: specifying means for specifying the current camera position in the three-dimensional space and the current time in prescribed intervals; and control means for controlling the sky, weather, and degree of weather which at least form a part of the background of the display screen in accordance with the camera position and current time specified by the specifying means.

The fourth invention is an image generating device which requests images of components completed by arranging and structuring virtual components in a virtual three-dimensional space, characterized in comprising: storage means for priorly storing differences of at least the type, attribute, and arranged environment of the components and parameters corresponding thereto; selection means for designating the parameters and selecting the component; and arranging means for arranging the selected component with an algorithm simulating human sensitiveness and structuring the completed component.

The fifth invention is an image generating device for generating image of a virtual role-playing game in a virtual three-dimensional space, characterized in comprising: mode ratio selection means capable of selecting the mode ratio of the time length of the manual mode in which the player advances the role-playing game in real time, and the time length of the auto mode in which the device side compulsorily advances the role-playing game. Preferably, the mode ratio selection means is either means for priorly selecting the mode ratio before shipment of the image generating device, or means for a player to select the mode ratio upon starting the role-playing game.

BRIEF DESCRIPTION OF THE DRAWINGS

FIG. 2 is a schematic flowchart showing the room layout routine.

FIG. 5 is a typical diagram explaining the mode comparison table.

FIG. 8 is a typical diagram explaining the weather table.

FIG. 9 is a diagram illustrating the weather data format.

BEST MODE FOR CARRYING OUT THE INVENTION

A game device according to one embodiment of the present invention is now described with reference to the drawings. Although the explanation of this game device is made in the mode of playing an RPG (role-playing game), the game contents to be executed by the game device according to the present invention are not necessarily limited to RPG, and in accordance with the gist of the descriptions in the claims, may be applied to suitable games such as fighting games, ball games, and so on.

Figure 1:
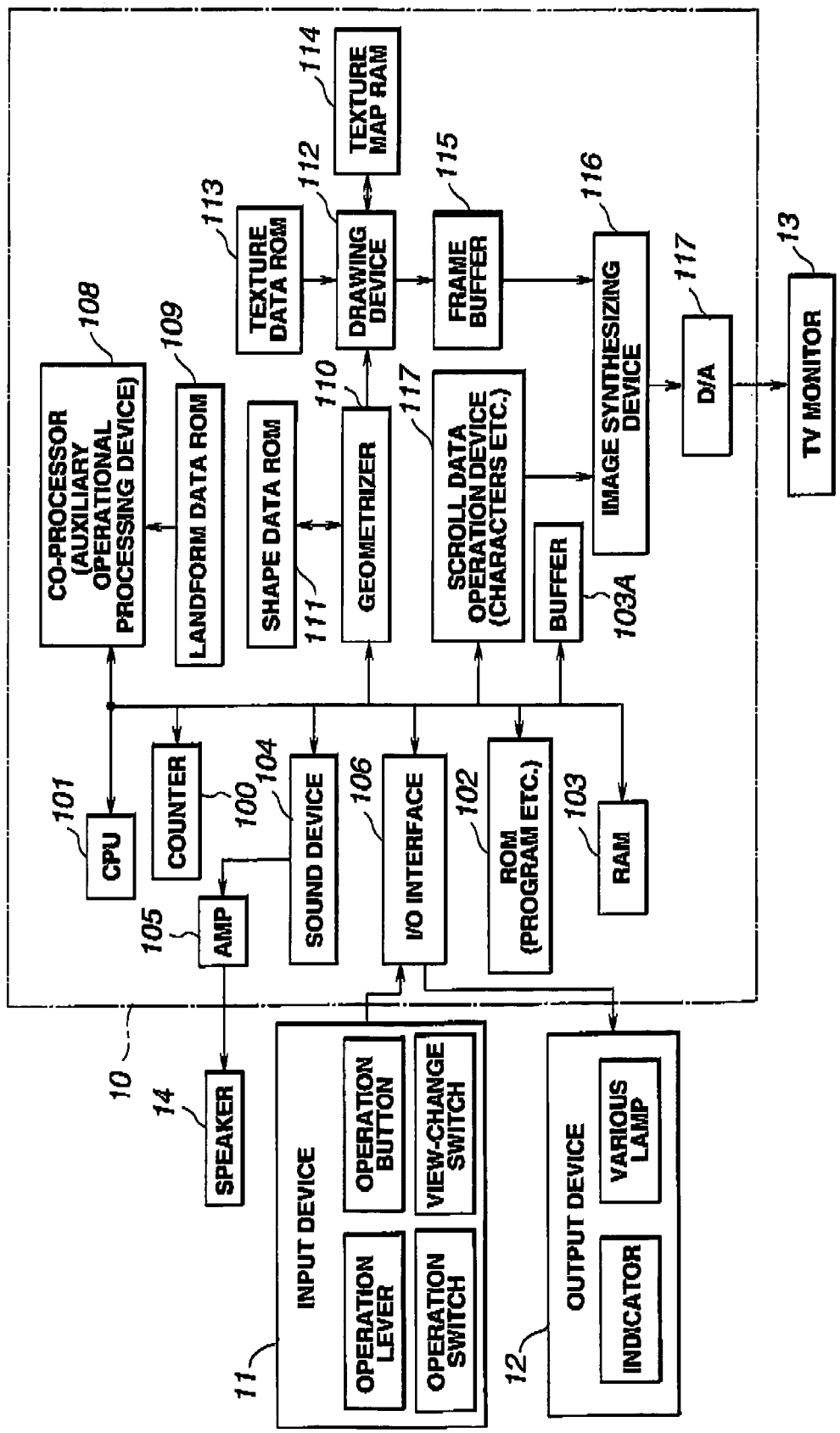
FIG. 1 is an electrical block diagram of the game processing board of the game device as the image processing device according to one embodiment of the present invention.

FIG. 1 shows a block diagram of the game device according to the present embodiment. This game device comprises a game processing board 10, input device 11, output device 12, and TV monitor 13. The input device 11 is used by the player for inputting mode ratio selection information described later for game commencement preparation and inputting operation information in the manual mode of a role-playing game, and comprises an operation lever, operation button, view-change switch and so on. The output device 12 comprises an indicator for making indications relating to the game, and various lamps.

As shown in FIG. 1, the game processing board 10 comprises a clock not shown, as well as a counter 100, CPU (Central Processing Unit) 101, ROM 102, RAM 103, behind clipping buffer 103A, sound device 104, I/O interface 106, scroll data operation device 107, coprocessor (auxiliary operational processing device) 108, figure data ROM 109, geometrizer 110, shape data ROM 111, drawing device 112, texture data ROM 113, texture RAM 114, frame buffer 115, image synthesizing device 116, and D/A converter 117.

Among the above, the CPU 101 is connected, via a bus line, to the ROM 102 storing prescribed programs and image processing programs, RAM 103 storing operation data, sound device 104, I/O interface 106, scroll data operation device 107, coprocessor 108, and geometrizer 110. The RAM 103 is to be functioned for the buffer, and is used for writing various commands to the geometrizer (display of objects, etc.) and writing necessary data upon various operations.

The I/O interface is connected to the input device 11 and output device 12, and operation signals of the input device 11 are incorporated into the CPU 101 as digital values. The sound device 104 is connected to the speaker 14 via the power amplifier 105. Thereby, sound signals generated at the sound device 104 are power amplified, and output from the speaker 14 as sound.

The CPU 101, based on the internal programs of the ROM 102, reads operation signals from the input device 11 and landform data from the landform data ROM 109, or shape data from the shape data ROM 111 (three-dimensional data such as "characters" and "backgrounds such as landforms, sky, various structures"), and performs operations including behavior calculations (simulations) of characters and calculations of special effects.

Behavior calculation is for simulating the movement of the character in a virtual three-dimensional space. In order to implement this calculation, after the coordinate values of the character polygons in the virtual three-dimensional value are determined, conversion matrix and shape data (polygon data) for converting the coordinate values into a two-dimensional coordinate system are designated to the geometrizer 110. The landform data ROM 109 is connected to the coprocessor 108, and predetermined landform data is delivered to the coprocessor 108 and CPU 101. The coprocessor 108 is mainly responsible for the operation of floating points. Thus, as various judgments are executed with the coprocessor 108 and the judgment results thereof are provided to the CPU 101, the operational load of the CPU is lightened.

The geometrizer 110 is connected to the shape data ROM 111 and drawing device 112. As mentioned above, shape data (three-dimensional data of characters, landforms, and backgrounds formed of the respective apexes) formed of a plurality of polygons is priorly stored in the shape data ROM 111. This shape data is delivered to the geometrizer 110. The geometrizer 110 conducts perspective conversion to the designated shape data with the conversion matrix sent from the CPU 101, and obtains data converted from the coordinate system of the three-dimensional space to a visual field coordinate system.

The drawing device 112 affixes texture to the shape data of the converted visual field coordinate system and outputs this to the frame buffer 115. In order to affix such texture, the drawing device 112 is connected to the texture data ROM 113 and texture map RAM 114, and also to the frame buffer 115.

Here, polygon data shall mean a coordinate data group of relative or absolute coordinates of the respective apexes of polygons (polygonal: mainly triangles and quadrilaterals) formed from an aggregate of a plurality of apexes. The landform data ROM 109 stores polygon data that is set comparatively rough and sufficient upon executing prescribed judgments (collision judgment, etc.). Meanwhile, the shape data ROM 111 stores polygon data that is set more precisely in relation to shapes structuring screens such as enemies and backgrounds.

The scroll data operation device 107 calculates data of scroll screens (stored in the ROM 102) of letters and the like. This operation device 107 and the frame buffer 115 arrive at the TV monitor 13 via the image processing device 116 and D/A converter 117. Thereby, polygon screens (simulation results) of characters and landforms (backgrounds) temporarily stored in the frame buffer 115 and the scroll screens such as letter information are synthesized in accordance with a designated priority, and final frame image data is generated for every fixed timing. This frame image data is converted into analog signals with the D/A converter 117 and sent to the TV monitor 13, and displayed as a game screen.

This game device conducts a role-playing game (RPG) pursuant to the operation processing described later executed mainly with the CPU 101.

<Room Preparation Routine>

In this game device, a room preparation routine is, activated as a tool upon application preparation, and makes a layout of virtual rooms necessary in a role-playing game. Moreover, the room preparation processing may be suitably activated during the execution of the application.

Pursuant to this routine, rules for arranging furniture are created based on the human process of thinking, furniture and daily articles are arranged utilizing random numbers, and rooms filled with air of livelihood in the virtual game space are generated.

Specifically, as shown in FIG. 2, the CPU 101 controls the series of flows to execute the above. Foremost, parts such as walls and furniture are prepared (step S1). Effectiveness is increased with more parts. Moreover, conditions of the resident of the room are set (step S2). As conditions for the resident, for example, listed may be gender, age, marital status, family make-up, health condition, financial status, etc. Next, furniture is listed (step S3). In other words, a list of furniture is compiled in accordance with the conditions listed at step S2.

Figure 3A:
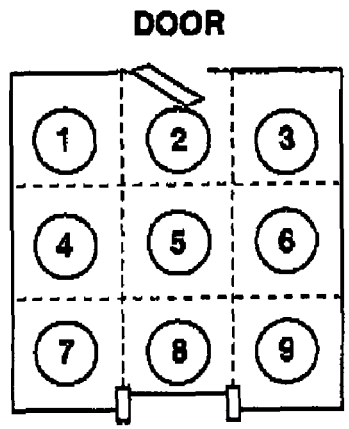
FIG. 3 is a diagram explaining the room layout.
Figure 3B:
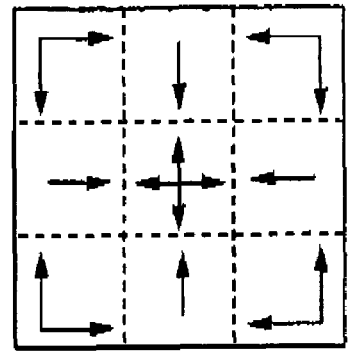

Thereafter, the rooms are divided into areas for each characteristic thereof (step S4). This divisional example is shown in FIG. 3(*a*). In the divisional example of this diagram, the main positions where furniture is placed are areas 1, 3, 4, 6, 7 and 9. With respect to area 8, it will depend upon the form of the window. For example, although an object may not be placed there if this window is an entrance to the veranda, there may be cases where furniture having a height similar to the lowermost edge of the window is placed. Area 5 is the central area of daily living and a table is placed there as the furniture. Further, as the resident will not be able to access the door, normally, furniture is not placed at area 2. According to this area division, as shown in FIG. 3(*b*), the furniture direction of the respective areas is decided. Areas 1, 3, 7 and 9 may be selected from two directions, and areas 4, 6 and 8 will only be one direction, and area 5 will be all directions (360°).

Next, the central point of living is set (step S5). The TV and audio (particularly speakers) are made to face such central point of living. In this embodiment, the central point of living is decided with the following priorities: center of the table as the first priority, center of the sofa as the second priority (when there is no table), and center of the room as the third priority (when there is neither a table nor sofa). As an exception, if an attribute is provided wherein the resident of the room is living under medical treatment, the position of the pillow will be set as the central point of living.

Furniture is then arranged (step S6). Set as arrangement data (parameter) of furniture are, for example:

Type of furniture: bed, cabinet, desk, table, TV, sofa, etc.
Size: length, width, height of furniture
Storage space: (length, width, height)×margin
Arrangeable area: divisional area 1, 3, etc.
Grade, age range: suitable conditions Further, arrangement rules are set as follows.

1) The arrangement place (area) is decided with a table of random numbers. By changing the random number seed, many different rooms may be prepared. 2) Furniture is arranged in order from large furniture, and those that do not fit due to lack of space are disposed. 3) Furniture that will not fit in one area will be arranged upon performing area expansion processing when there is an open space in the peripheral areas. Peripheral areas of the expanded area will be reduced. 4) When there is extra space in the area as a result of arranging the furniture; peripheral areas thereof are expanded.

Finally, daily articles and wall objects are arranged (step S7). Particularly, ingredients, food, tableware figurines, stationary, clothing, etc. are respectively arranged in the arrangeable areas for each type thereof. Moreover, wall clocks, paintings, posters, calendars, etc. may be respectively arranged in the arrangeable areas for each type thereof.

Pursuant to the aforementioned room-preparation routine, furniture will not be arranged in front of windows and doors, and it is possible to priorly set the areas (e.g., corner of the room, by the wall, center, ceiling, etc.) where furniture should basically be arranged pursuant to the type thereof. It is also possible to priorly set parameters representing the characteristics (tidy, untidy, deserted, warehouse, etc.) of the respective rooms and layout the rooms upon designating such parameter. It is further possible to adjust the table of random numbers to have these kinds of characteristics. As a result, although vast amounts of time and labor were conventionally required upon preparing numerous rooms since the entire room was treated as one object, in this embodiment, many rooms can be laid out easily and in a short period of time. In addition, it is further possible to accurately reflect the analog feeling of humans for individual layouts. For example, it is less likely for tables and chairs to be arranged along the wall or at the corner of the room, and, contrarily, large furniture such as beds and shelves will be arranged along the wall or at the corner of the room. Further, as the arrangement rule of this embodiment is not selected among patterns, the possibility of an identical room being prepared is close to none, and various rooms may be prepared in an extremely short period of time. This may also be adopted for the preparation of map data.

<Main Routine Processing>

Next, explained is the main routine executed by the CPU 101 of the game device according to the present embodiment. This main routine includes the mode ratio selection routine processed interactively between the player prior to the start of the game, and the role playing game (RPG) processing routine executed thereafter.

Figure 4:
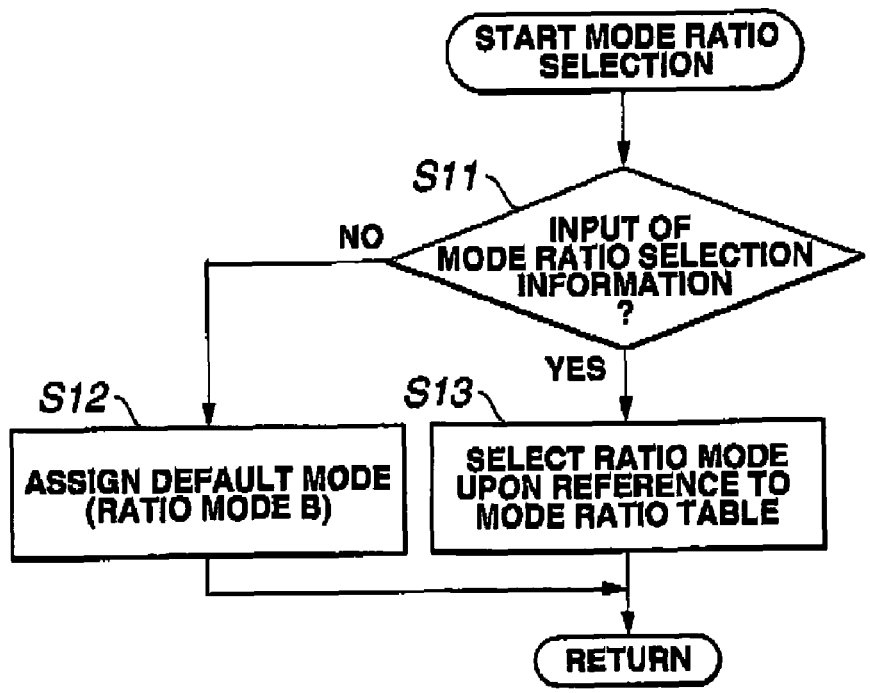
FIG. 4 is a schematic flowchart showing the mode-ratio selection routine.

The mode ratio selection routine is foremost explained with reference to FIGS. 4 and 5. This mode ratio may be priorly set by the software producer in accordance with the trend of the market (e.g., domestic use, business use, or in accordance with the country of export) to which the software is to be shipped.

Firstly, the CPU 101 judges whether if the mode ratio selection information was provided from the input device 11 (step S1). When this information is provided, the CPU 101 refers to the "mode ratio table" in accordance with the contents thereof, and selects the ratio mode (step S12). In the mode ratio table, as shown in FIG. 5, ratio modes A-C are set in correspondence with the levels of hard, intermediate and easy with respect to the difficulty of the RPG. In hard ratio mode A, time T2 of the manual mode, which is the RPG real-time progression mode, is longer than time frame T1 of the auto mode, which is the automatic progression mode. In the intermediate ratio mode B, time T0 of the manual mode and time frame T0 of the auto mode are equal. In the easy ratio mode C, time T1 of the manual mode is shorter than time frame T1 of the auto mode. Thus, it is possible to adjust the difficulty of the RPG with the ratio of the length of time of the manual mode.

Meanwhile, at step S11, if no information regarding the mode ratio selection is input from the player, the CPU 101 compulsorily assigns ratio mode B, which is of an intermediate difficulty (step S13).

Accordingly, as the difficulty of the RPG may be easily set in accordance with the preference of the player, it is possible to enhance the player's interest in the game. It is further possible to easily provide a game device having a game level for all age groups or in consideration of the market trend. Thus, it is possible to improve the versatility and general usability as a single device.

Next, the RPG processing routine is explained with reference to FIGS. 6 to 15. This processing routine, for example, is repeatedly executed by the CPU for each one field (Δt=1/60 sec.) in synchronization with a display interrupt.

Foremost, the CPU 101 judges whether the current game progression mode of the RPG is an auto mode (step S21). Here, if it is in the auto mode, the CPU 101 orders the display processing for automatically progressing the story, which is set in advance pursuant to this mode, and stands by for the next processing (step S22). The display contents of the display processing in this auto mode may be set to be freely rewritable, and the display mode is not limited to a full 3D image, and may be a movie.

Figure 12:
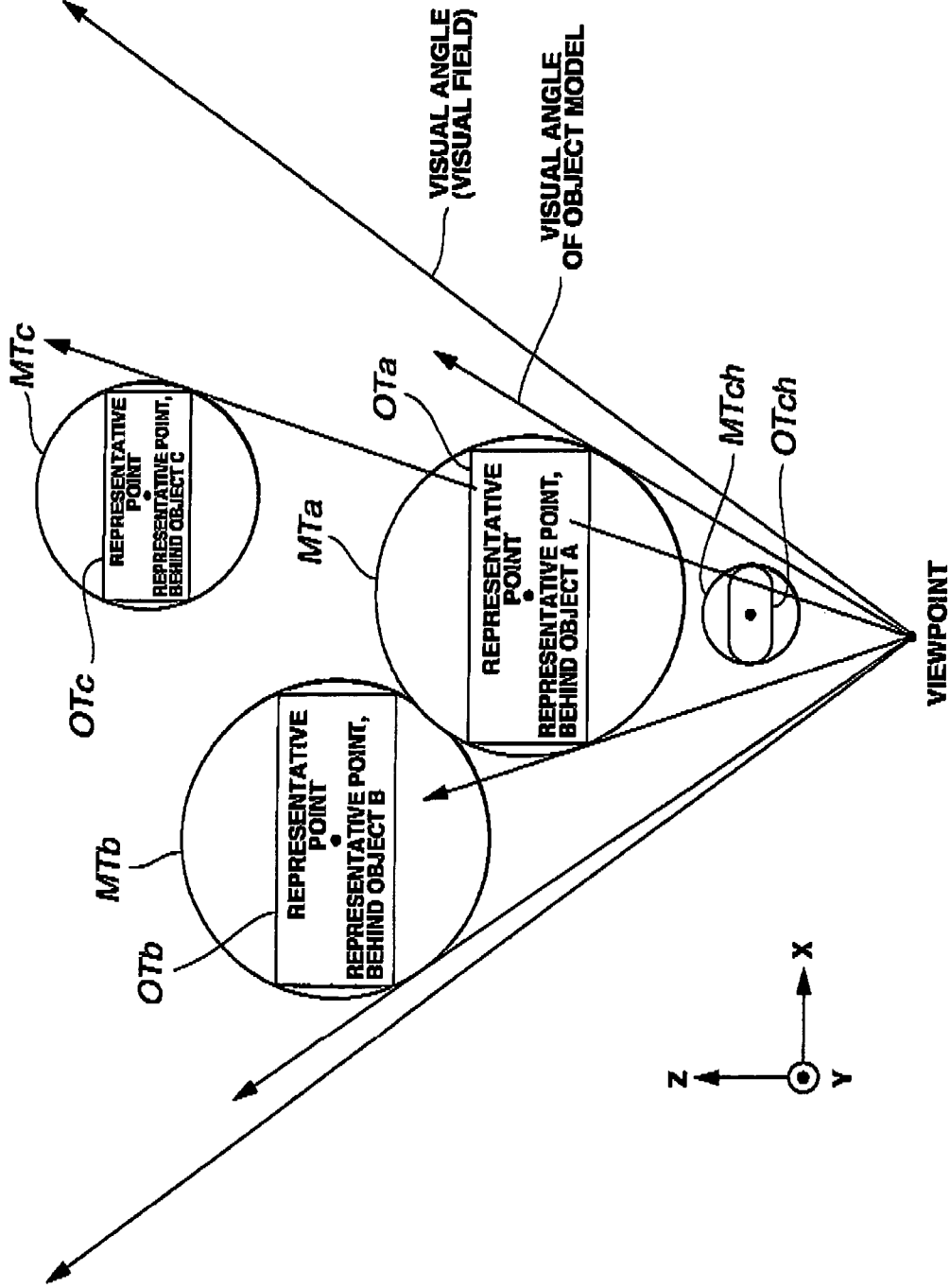
FIG. 12 is a diagram explaining the position relationship between the viewpoint, visual field, object, and object model on the X-Z face of the world coordinate system (game space).
Figure 13:
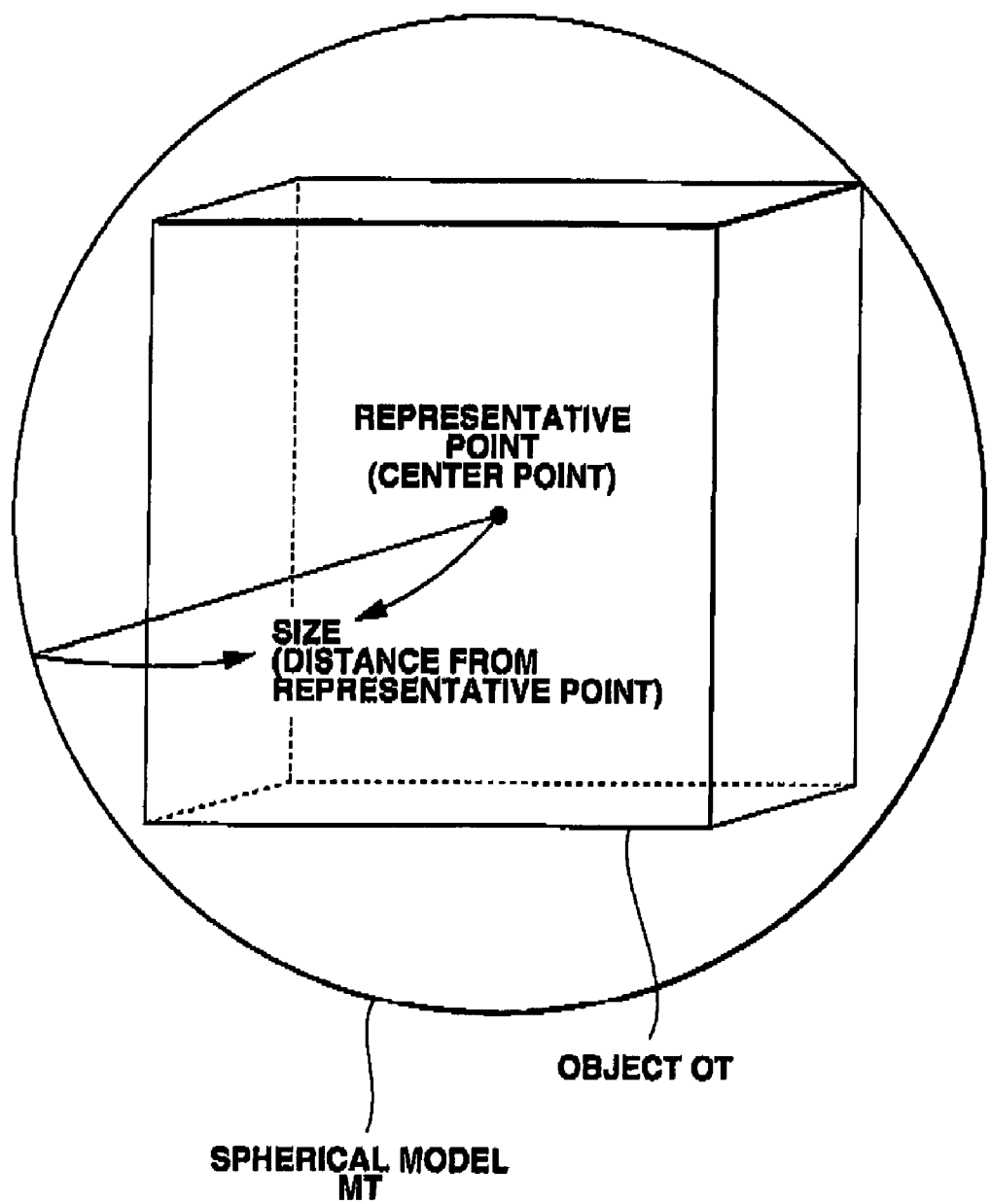
FIG. 13 is a diagram explaining the modeling of an object into a spherical model.

Meanwhile, if NO at step S21; that is, when it is judged as being in the manual mode, the CPU 101 reads the player's operational information provided via the input device 12, and operates the viewpoint position and the visual field angle of the virtual camera on the game space from such information as shown in FIG. 12 (steps S23, S24). Next, the collision judgment of the character object and the background (including the behind object described later) is conducted (step S25).

Further, depending on the game, there are types where the element of RPG and the element of action games coexist in a single game. This is in order to give the game versatility so that many players may be able to enjoy the game. Here, as the operation method will change in accordance with the respective game elements, there may be cases where a player is forced to play a game element that he/she is poor at. In consideration of such a case, it is preferable to select in advance the game element preferred by the player, or the game element disliked by the player. Thereby, the game will be switched to the manual mode when it is a scene of a game element at which the player is skillful, and switched to the auto mode when it is a scene of a game element at which the player is not so skillful. Or, if the producer of the game wishes to show a specific scene during the game, the same may be switched to the auto mode even if it is a game element at which the player is skillful. Moreover, the timing and frequency of switching may be adjusted in order to make the player play at least some of the game element at which he/she is not so skillful.

Here, a character object shall mean an object to be moved in the game space, and prepared with polygon data. Further, a behind object shall mean an object which forms a part of the background but which does not move, and also prepared with polygon data. As one example, let us imagine a scene in the manual mode where Godzilla is walking through the city among buildings. It would be preferable to structure Godzilla as a character object and the buildings (structural objects) as behind objects.

In addition, the game contents include an action section as well as the RPG section, and operation method also changes. It is possible to set either the auto mode or the manual mode in accordance with the game mode.

Next, the CPU 101 executes the subroutine of the weather processing (step S26). An example of this processing is explained in detail with reference to FIGS. 7 to 9.

Figure 6:
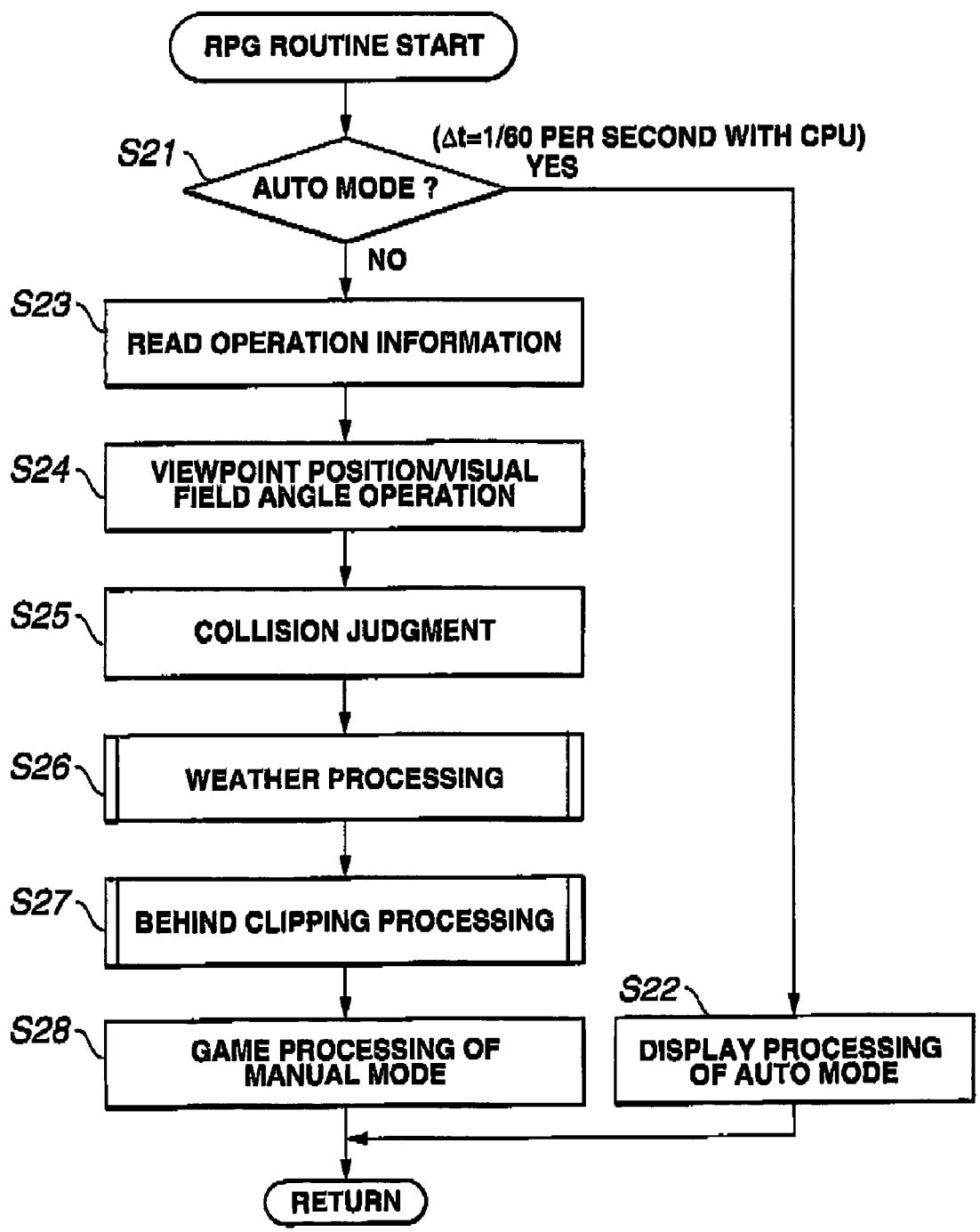
FIG. 6 is a schematic flowchart showing the RPG routine.
Figure 7:
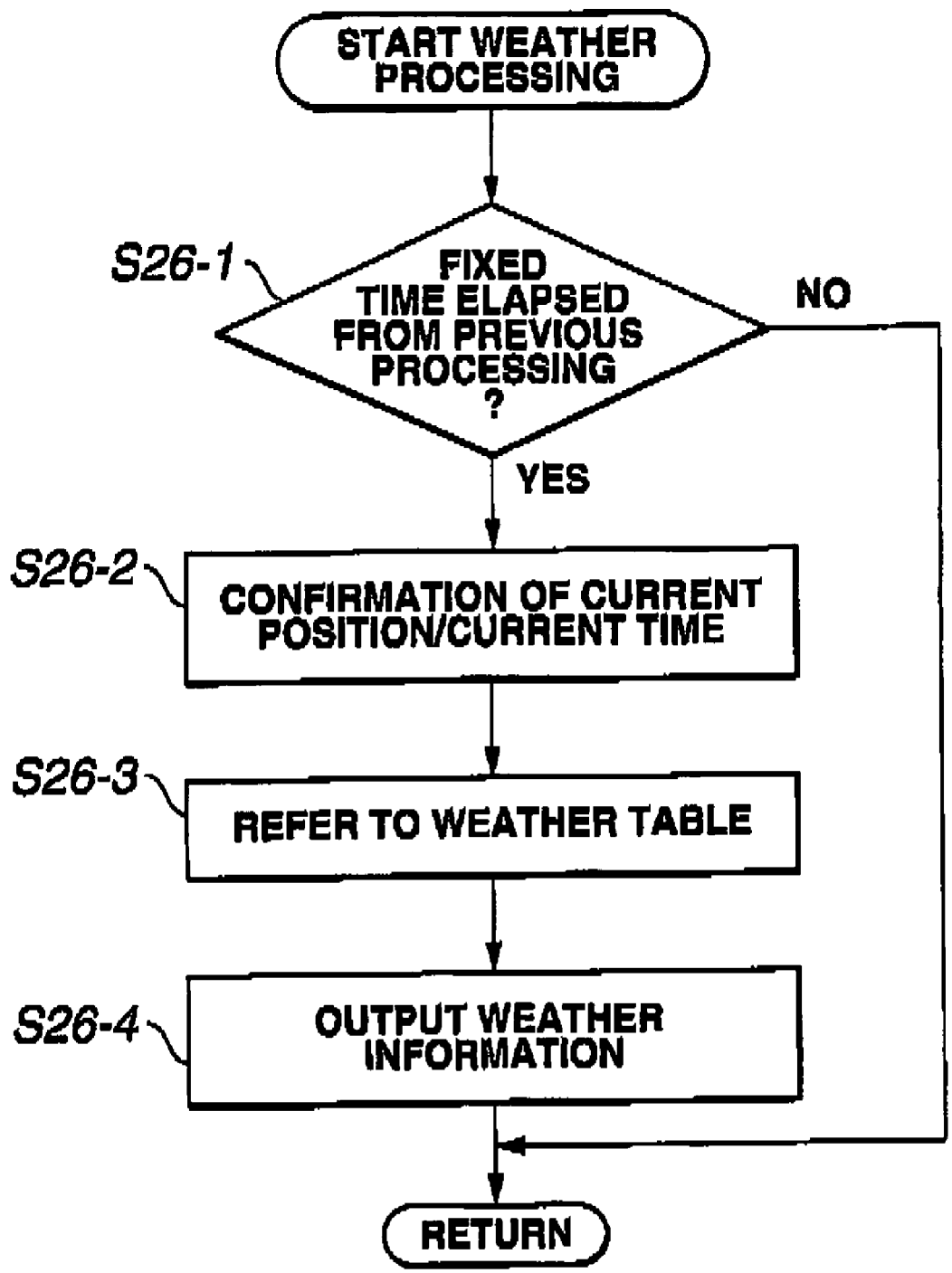
FIG. 7 is a schematic flowchart showing the subroutine of the weather processing.

The CPU 101 judges whether a prescribed time (e.g., one hour) has elapsed from the previous timer interrupt processing and, if No (one hour has not yet elapsed), returns the processing to FIG. 6 (step S26-1). However, if one hour elapses while the CPU 101 is repeating this processing and the judgment is YES, the CPU 101 decides the current camera viewpoint position from the operational information and further decides the current time from the clock value of the internal clock (step S26-2). Then, the CPU 101 seeks the weather information (meteorological information) corresponding to this decided information by referring to the weather table set in advance (step S26-3, 4). The obtained weather information is delivered to the geometrizer 110 and the scroll data operation device 107.

Since the weather table is set for each prescribed area (position) of the game space, as shown with the setting contents in FIG. 8, set in detail are the date, and the sky (background), weather, and degree of weather for each hour. Among the above, conditions of rain, sleet and snow are displayed, for example, by using a plurality of objects structured with polygons. Moreover, sunny and cloudy are displayed by adjusting the brightness of the overall screen, and this brightness is changed in accordance with time. Further, it is possible to add wind (including the direction thereof) and velocity. FIG. 9 shows a structural example of the data format of weather information set for each position and for the respective times during the day.

In this weather information, the unit of area (position) may be set within a range where the player character may continuously move without having to switch the scene, or may be switched at an arbitrary position. Here, interpolation operation may be conducted such that the weather conditions at the boundary of switching do not change in a sudden manner.

Therefore, in comparison to conventional representations of weather conditions which merely change the sky (background) after a prescribed time elapses, it is possible to display detailed weather conditions realistically. Thereby, the ambience will be sufficient, and the interest in the game for the respective scenes of the RPG may be enhanced.

Thereafter, the CPU 101 executes the behind clipping processing (FIG. 6, step S27). The contents of the subroutine of this behind clipping processing are explained in detail in FIGS. 10 and 11.

Figure 10:
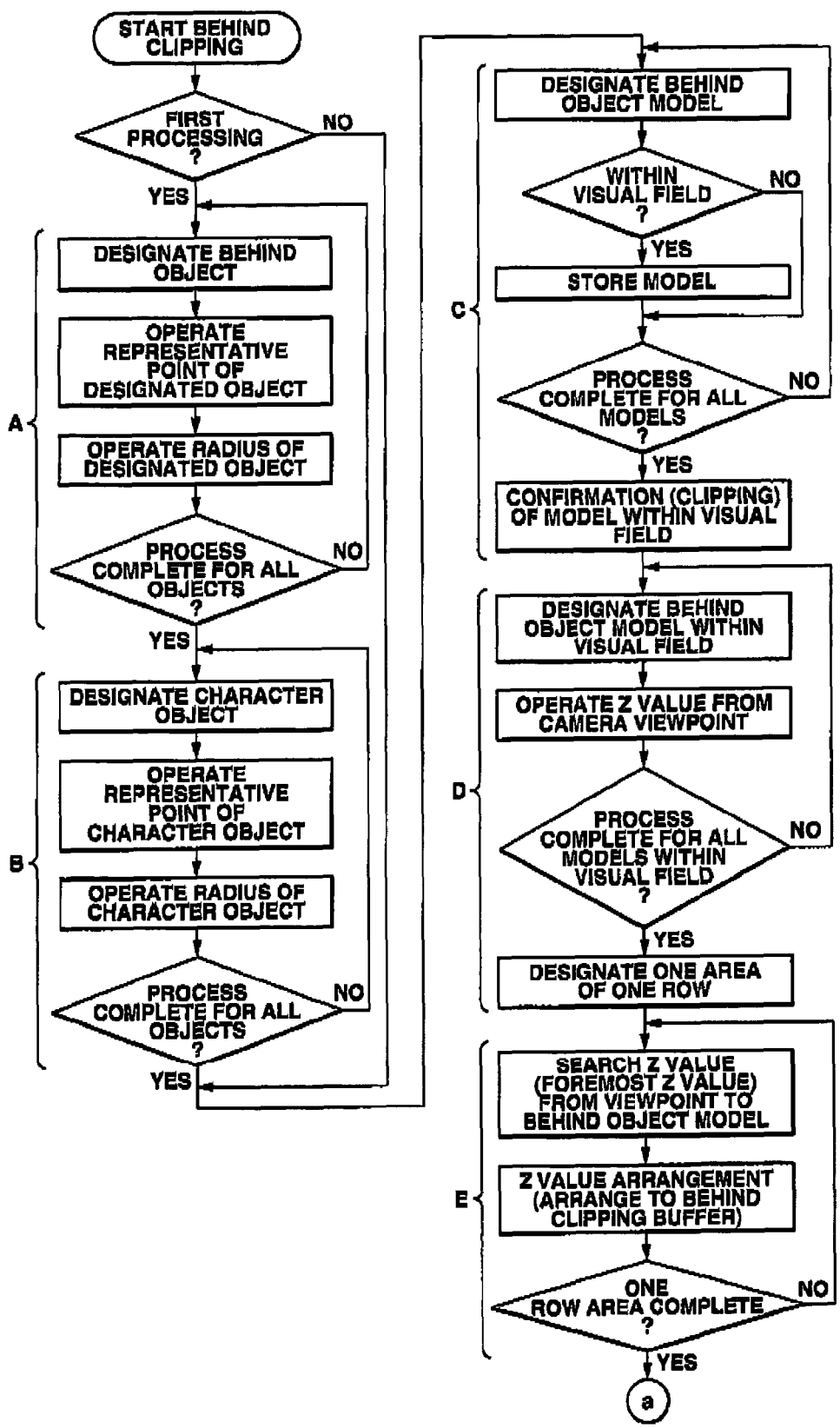
FIG. 10 is a flowchart showing a part of the subroutine of the behind clipping processing.
Figure 11:
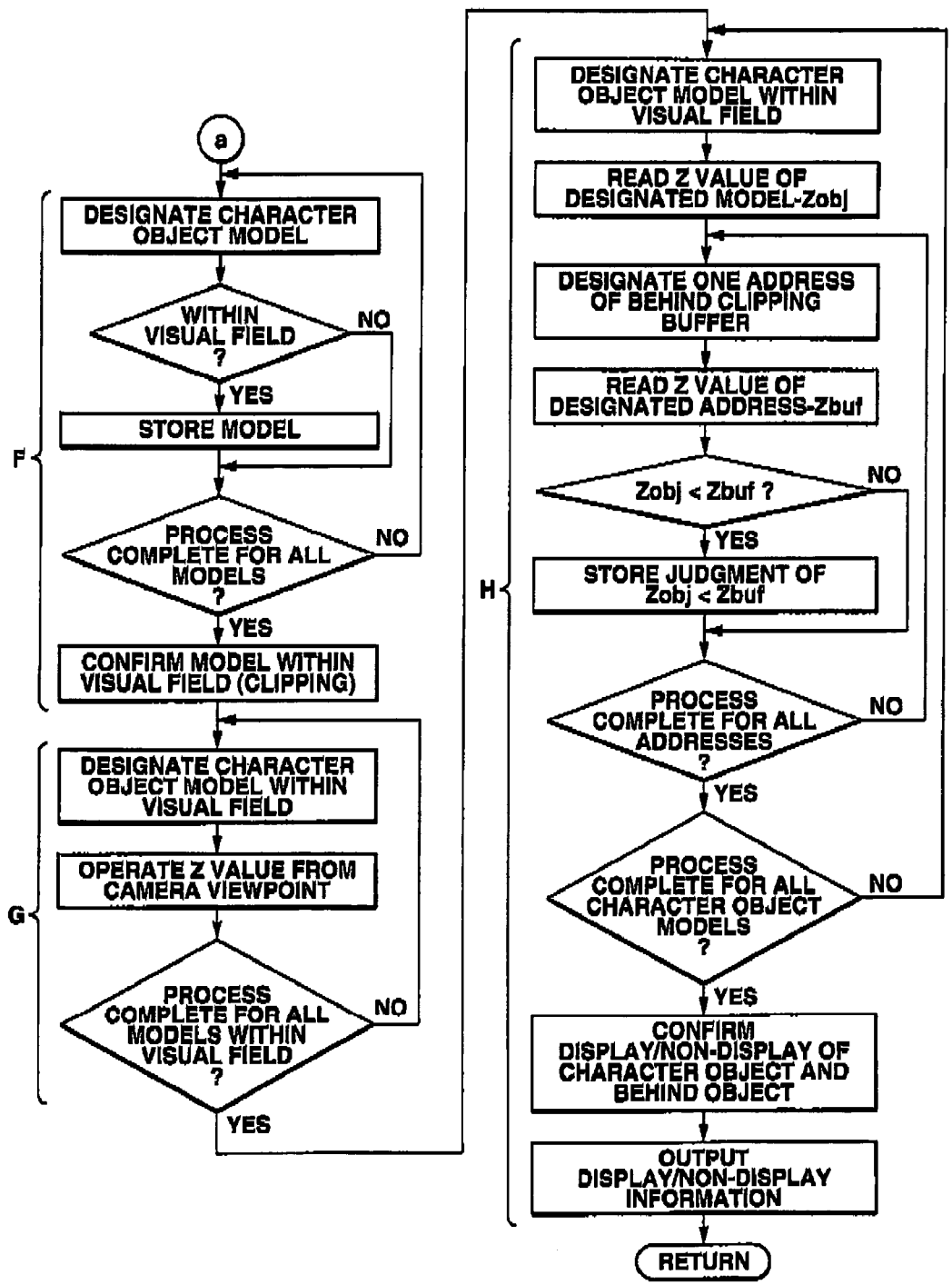
FIG. 11 is a flowchart showing a part of the subroutine of the behind clipping processing.

The processing steps shown in these drawings constitute a series of steps as described below:

1) Modeling processing A, B of the behind object and character object executed once at the time of initial timer interrupt (FIG. 10);

2) Check processing C for checking the inside of the camera visual field of the respective behind object models (FIG. 10);

3) operation processing D for operating the Z value from the camera viewpoint of the respective behind object models (FIG. 10);

4) Arrangement processing E for arranging the Z value of the front part of the behind object model to the behind clipping buffer (FIG. 10);

5) Check processing F for checking the inside of the camera visual field for the respective character object models (FIG. 11):

6) Operation processing G for operating the Z value from the camera viewpoint of the respective character object models (FIG. 11); and 7) Display and non-display order processing H of the character object upon comparison of the Z values (FIG. 11).

Specifically, in the modeling processing, as shown in FIGS. 12 to 15, the representative point (e.g., centroid point) of a plurality of set behind objects OTa, OTb, OTc (e.g., building) and of one or a plurality of character objects OTch are operated from the vertex data. Further, the distance from such representative point to the farthest end is calculated, and simulatively prepared are spherical behind object models MTa, MTb, MTc and character object MTch in which the representative point is the center thereof and such distance is the radius thereof. Moreover, the end to the representative point does not necessarily have to be the farthest portion, and may be suitably determined. In other words, it may be suitably determined in accordance with the form of the object.

In check processing C, checked one after another is whether behind object models MTa, MTb and MTc on the game space are respectively positioned within the current visual field, and stored are identification numbers of the behind object model positioned within the visual field. Thereby, the model within the visual field is decided, and models outside the visual field are clipped.

Next, in operation processing D, behind object models MTa, MTb and MTc judged as being positioned within the visual field are considered subjects of display, and operated is the Z value (distance) from the camera viewpoint to, for example, the spherical surface or representative point of the respective models.

Figure 15:
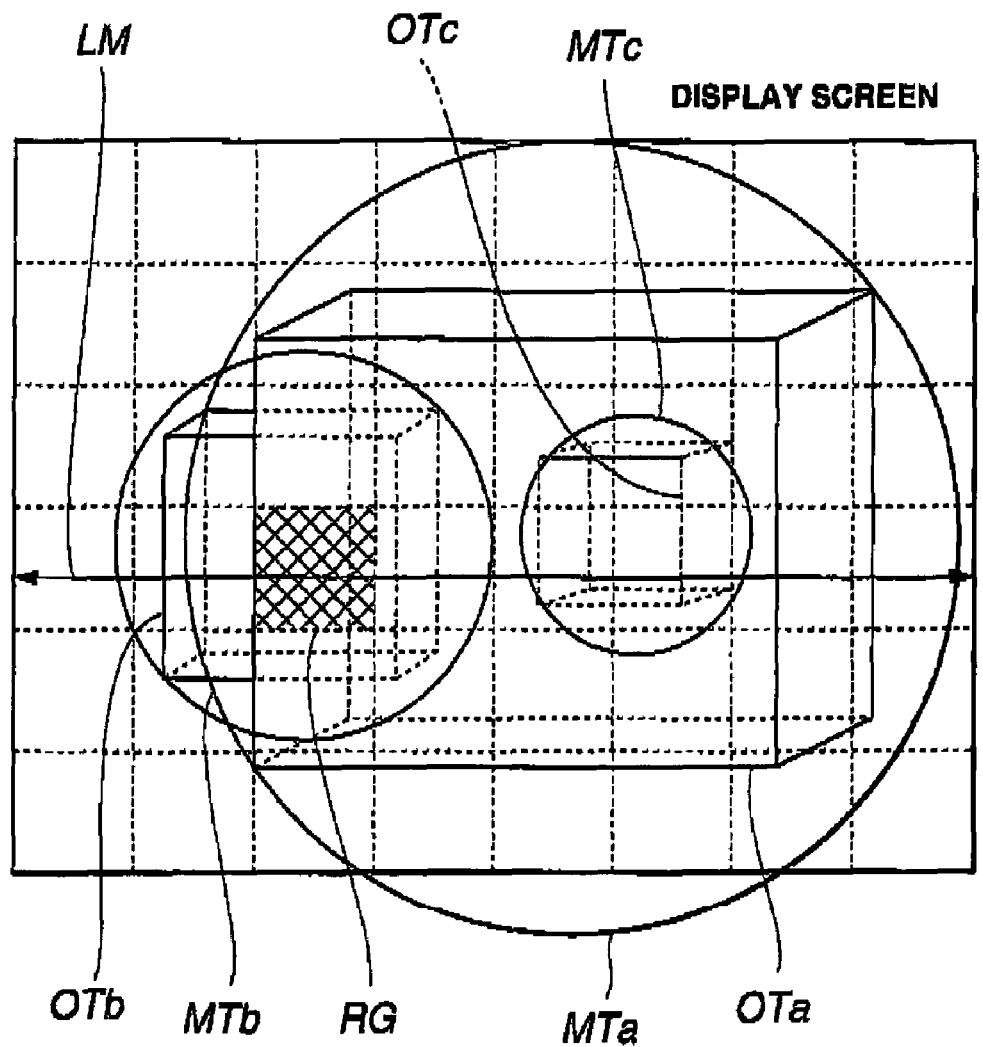
FIG. 15 is a diagram explaining the position relationship of the display screen, area divided in accordance therewith, and object model.

Then, in arrangement processing E, as shown in FIG. 15, the display screen is simulatively divided into a plurality of areas (or cells) RG in a checkered design, and each area RG is made to individually correspond with an address of the behind clipping buffer 103A. Ordinarily, a camera viewpoint is positioned to be at a prescribed height behind the player character so as to follow such character while moving in approximately the horizontal direction. Thus, since there is hardly any vertical movement, here, only one line of area line LN in the sideways direction corresponding to the height approximately concurring with the camera eye level within the checkered area needs to be selected. Each area RG forming this area line LN is made to individually correspond to an address of the behind clipping buffer 103A. The reason it is restricted to one sideways line in consideration of the viewpoint camera behavior and the camera eye level is in order to lighten the operation load for searching the Z value and comparing the Z value as much as possible. Further, the size of one area RG is set to be in a prescribed size sufficiently larger than one pixel and, therefore, it is additionally possible to lighten the operational load by roughly searching and comparing the Z value.

When the selection of area RG for one line LN worth in the sideways direction is completed, implemented is the Z value search to the behind object models MTa, MTb and MTc via each area RG from the viewpoint. Thereafter, the Z value of the behind object model initially searched is stored in the address corresponding to the behind clipping buffer 103A. In this search, when a behind object model cannot be searched, a default value near the infinite point set in advance is stored. Moreover, when a plurality of behind object models are found upon searching the same area RG, the Z value of the front model has priority.

As a result, regarding the Z value of the eight area RGs for one line worth in the sideways direction as typically shown in FIG. 15, the default value, Z value of model MTb, Z value of model MTa, . . . (the third block to the eight block on the right side have the Z value of model MTa) are searched from the left side, and stored in the behind clipping buffer 103A.

Further, the search and storage of this Z value may be executed for the entire area of the set two-dimensional distribution, or, if the camera eye level changes in the vertical direction on the game space, such search and storage may be executed for the areas of the vertical direction as well.

Moreover, in the check processing F shown in FIG. 11, the character object model is also checked in a similar manner as with the aforementioned behind object model regarding whether it is within the visual field, and if it is outside the visual field, it is clipped. This clipping is executed for the respective objects when there are a plurality of character objects.

In the operation processing G thereafter, the z value until the representative point of the character object model MTch, for example, is operated. This operation is also executed for all character objects.

Then, after proceeding to the display and non-display order processing H as shown in FIG. 11, one character object model positioned first in the visual field is designated. Next, the Z value Zobj of this designated model is read from the RAM. Next, one address of the behind clipping buffer 103A is designated, and the Z value Zbuf of the front behind object model when viewed from the one area RG stored in such address is read. When this is completed, the judgment of whether Zobj<Zbuf is conducted, and when YES (i.e., when Zobj<Zbuf is confirmed), the information on this confirmation is stored in the RAM. Thereafter, the routine proceeds to the next address of the buffer 103A and similar processing is repeated until it is completed for all addresses. After the processing for all addresses has been completed, the aforementioned comparison processing is repeated for all character addresses.

When the series of comparisons are complete, the comparison result; that is, the information on the confirmation of Zobj<Zbuf temporarily stored is affirmed, and whether to make the character object CTch a display subject from such information, and whether to display which behind object is affirmed. In the aforementioned comparison judgment, if Zobj>Zbuf is confirmed even once, it can be acknowledged that the character object OTch, as illustrated in FIG. 12, is located in front of all behind objects Ota, OTb at the forefront within the current visual field; in other words, located in the game space closer to the camera. Here, the display of the behind object and the character object in the forefront are order to the geometrizer as a matter of course.

Moreover, ordinary shadow-face processing may be conducted between the character object and the forefront of the behind object, and between the character object and the behind object OTc behind the shadow of behind object OTa on the proximal end. Further, the aforementioned search result of the Z value may be used in place of the shadow-face processing.

Figure 14:
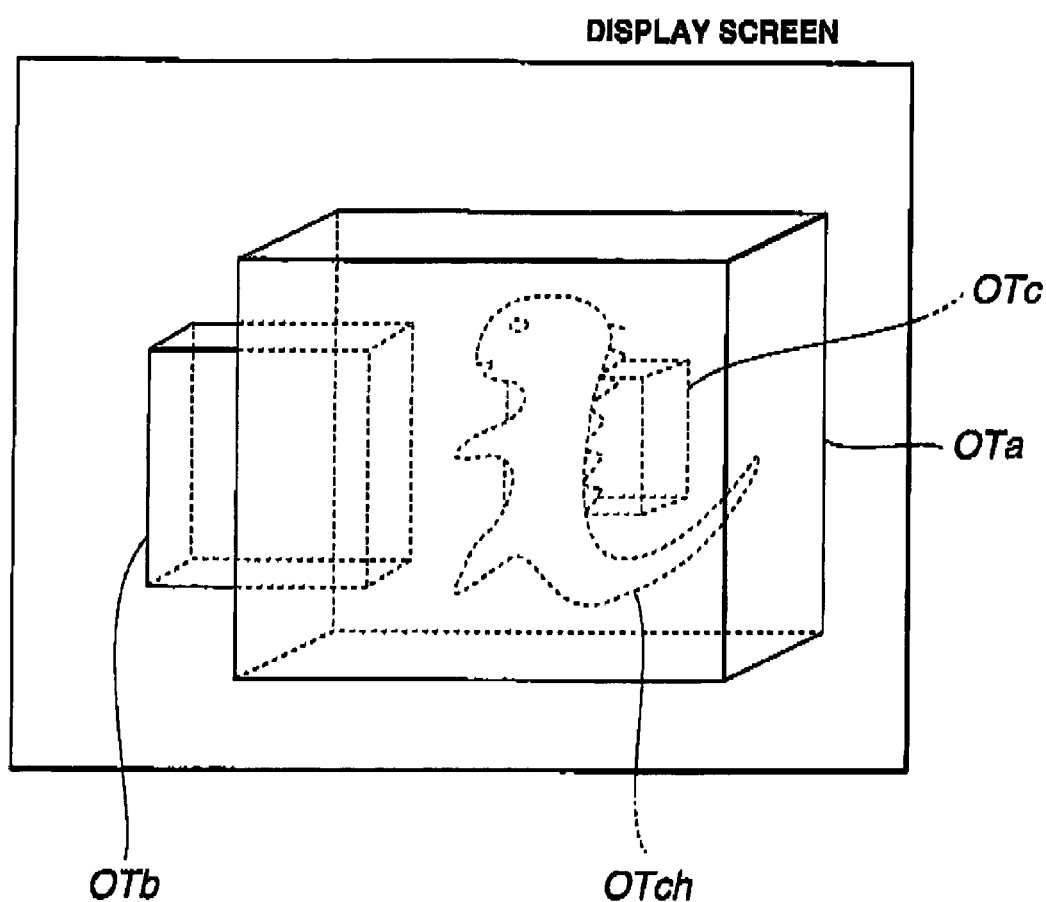
FIG. 14 is a diagram explaining one example of a display screen.

Contrarily, when Zobj<Zbuf cannot be confirmed, the character object will be completely hidden behind the behind object, and it can be easily acknowledged that it is not in a position viewable within the visual field (Cf. FIG. 14). Here, the non-display of the character object is notified to the geometrizer.

When the behind clipping processing is finished, game processing is ordered to the geometrizer 110 and the drawing device 112 at step S28 shown in FIG. 6. Thereby, images of the perspectively converted visual field coordinate system are displayed on the TV monitor, wherein RPG images are provided.

Upon this display, suppose a scene where Godzilla (character object) wanders into a number of towering buildings (behind object), for example, and fights the player. In this scene, when Godzilla is positioned in front of the buildings, the Z value Zobj of the spherical model of Godzilla will be smaller than the Z value Zbuf of the spherical model of the plurality of buildings positioned in the forefront seen from the viewpoint; i.e., since Zobj<Zbuf is confirmed, Godzilla is displayed with the front of the buildings as the background. However, when Godzilla moves and is completely hidden behind the buildings as shown in FIG. 14, Godzilla is not displayed. This judgment of whether to display Godzilla is not conducted with the conventional method of comparing in polygon units the polygon data forming the building and the Z value of the polygon data forming Godzilla.

That is, according to this behind clipping processing, buildings having complex shapes and Godzilla are converted into a spherical shape, and it would be sufficient to compare the z value of the building forming the front row and the z value of Godzilla as seen from the viewpoint obtained via the plurality of areas in a suitable size. Thus, the difference in the Z values; in other words, the position relationship can be very easily obtained in comparison to the conventional method. Moreover, in this embodiment, as the processing is limited to the area of one line in the sideways direction corresponding to the eye level, the judgment of whether to display Godzilla can be conducted with even less operational load. Therefore, the operational load relating to the display by the CPU is considerably lightened, and it is thereby possible to accelerate the processing speed or to distribute the operation to other game processing steps.

Figure 16:
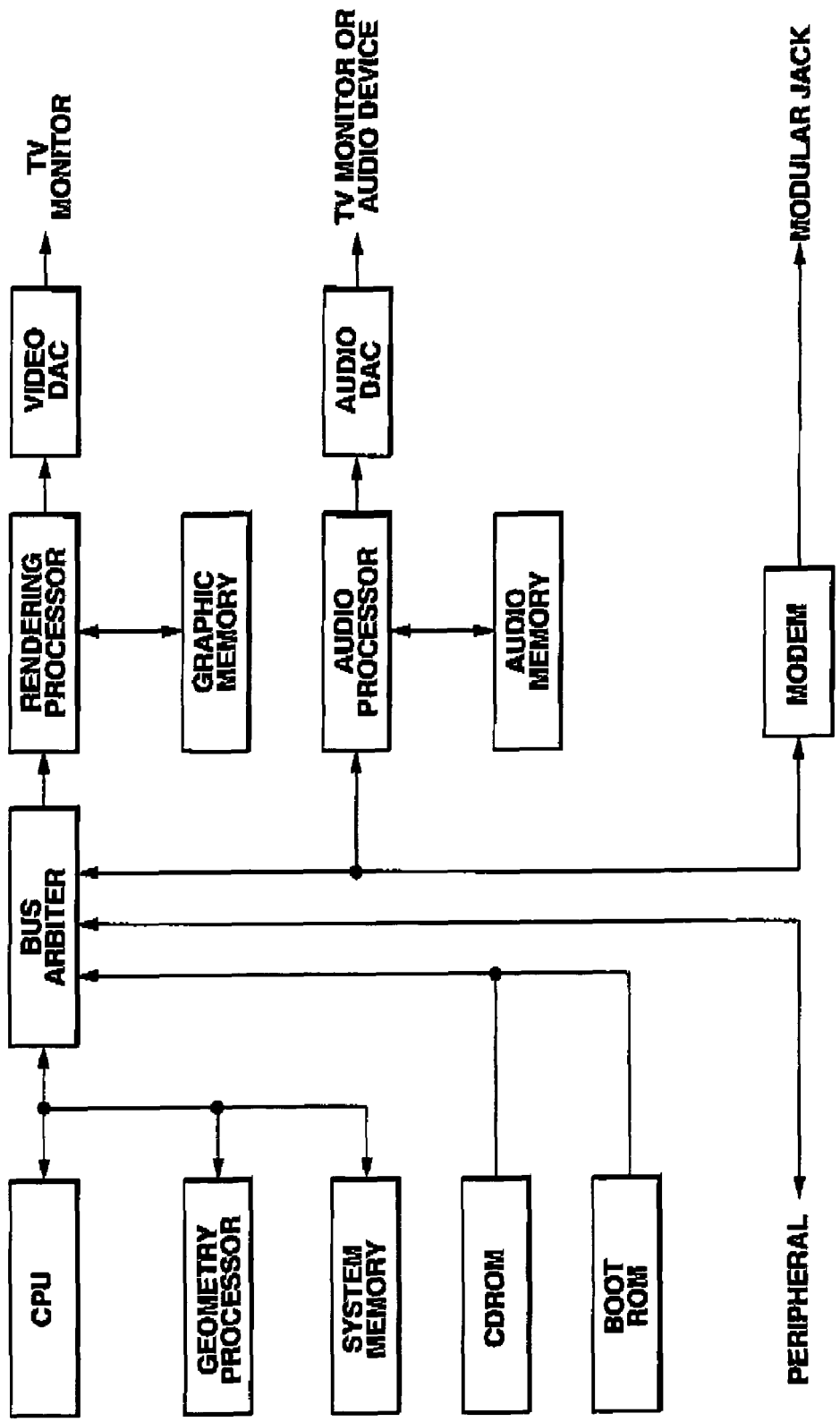
FIG. 16 is the second hardware block diagram employed in the present invention.

FIG. 16 shows an example of the second hardware diagram employed in the present invention. This block diagram is compatible with game devices for consumers. This game device comprises a CPU for controlling the entire system, geometry processor for conducting geometry operation, system memory such as a work RAM, CD-ROM as the storage medium storing the game program of the present invention, ROOT ROM storing the game activation program, bus arbiter for controlling the bus, rendering processor for executing rendering, graphic memory, video DAC for conducting D/A conversion of graphic data, audio processor, audio memory, audio DAC for conducting D/A conversion of audio data, and modem under the control of the bus arbiter. This game device is capable of exchanging data by linking to other TV game machines, PCs, network servers, host computers, Internet appliances and so on via a modem or communication circuit.

The shape of the model upon modeling the object is not necessarily limited to a sphere, and may be oval, cylindroid, cylinder, or a fixed arbitrary shape. A character object is not limited to a moving object, and may be a still object. In other words, it may be fixedly set to buildings as well. For example, this may be a still object such as a telephone pole or shop behind the building. The present invention displays objects on the proximal end from the viewpoint when there are a plurality of objects, simply models the objects with shadow erasure processing for non-display of objects in the back, and judges which model is on the proximal end when viewed from the viewpoint. For those objects behind another object, it is possible to remove such hidden object from a display subject without having to conduct geometry (coordinate) operation. As mentioned above, the simplified model is not limited to a spherical shape. But if a spherical shape is used, it would be possible to suitably set the diameter thereof. For example, there are spheres that fit within the object, and there are those that surround the object. Further, a plurality of spheres (simplified three-dimensional model) may be modeled for a single object.

INDUSTRIAL APPLICABILITY

As described above, according to the present invention, foremost, it is possible to sharply reduce the operational load consequent upon the display/non-display of an object with simple processing in consideration of the position relationship from the viewpoint from the object and the background.

Secondly, enabled are layouts and preparations thereof utilizing the analog sensitiveness of human beings as well as simultaneous substantial reductions of the operational load in games requiring the preparation of layouts of rooms and maps. Thereby, the disk will not have to be read each time upon entering into a room.

Thirdly, provided a game having improved reality and ambience by precisely expressing the time changes of the outside natural environment.

Fourthly, enabled are changes in the difficulty of RPGs in accordance with the player's preference or the market situation at the time of shipment.

Accordingly, provided is an image generating device suitable for games and which, in comparison to conventional devices, is abundant in realism and ambience, sharply enhances the game feeling and interest in the game, and improves the operational capacity pursuant to the lightening of the operational load.

We claim:

1. An image generating device for generating an image of a component completed by arranging a plurality of components in a plurality of divided areas in a virtual three-dimensional space, the device comprising:

storage means for storing, in advance, data on the plurality of areas, data on the plurality of components, a first parameter indicating characteristics of the plurality of areas and directions in which the plurality of components are to be arranged in each area, and a second parameter indicating at least types and sizes of the plurality of components and environments where the plurality of components are to be arranged;

selection means for selecting, based on the characteristics of the plurality of areas included in the first parameter, one component from among the plurality of components for which the second parameter has been designated;

arranging means for arranging, based on the directions in which the plurality of components are to be arranged in each area included in the first parameter, the selected component in any of the areas using one or more of a plurality of arrangement rules; and an imaging unit for generating image data to form the image of the component completed by arranging the selected component in any of the areas, wherein each of the plurality of components is selected based upon at least one condition corresponding to a resident of the virtual space, and wherein the plurality of arrangement rules include at least:
a first arrangement rule for deciding on one of any of the areas with a table of random numbers;
a second arrangement rule for arranging the components in an order of size and discarding remaining components that do not fit due to lack of space; and
a third arrangement rule for expanding or reducing any of the areas relative to a peripheral area according to arrangement of the components.

2. The image generating device according to claim 1, wherein the at least one condition includes one or more of gender, age, marital status, family make-up, health condition, and financial status.

3. The image generating device according to claim 1, wherein
the components include daily articles and wall objects; and
the daily articles and wall objects are arranged last.

4. The image generating device according to claim 1, wherein the components are arranged in each area based on a type of the area; and
the type is one of at least a corner, a wall, a center, and a ceiling.

5. The image generating device according to claim 1, wherein the characteristics includes at least tidy, untidy, deserted, and warehouse.

6. An image generating method for generating an image of a component completed by arranging a plurality of components in a plurality of divided areas in a virtual three-dimensional space, the method comprising:
storing, in advance, data on the plurality of areas, data on the plurality of components, a first parameter indicating characteristics of the plurality of areas and directions in which the plurality of components are to be arranged in each area, and a second parameter indicating at least types and sizes of the plurality of components and environments where the plurality of components are to be arranged;
selecting, based on the characteristics of the plurality of areas included in the first parameter, one component from among the plurality of components for which the second parameter has been designated;
arranging, based on the directions in which the plurality of components are to be arranged in each area included in the first parameter, the selected component in any of the areas using one or more of a plurality of arrangement rules; and
generating image data to form the image of the component completed by arranging the selected component in any of the areas,
wherein each of the plurality of components is selected based upon at least one condition corresponding to a resident of the virtual space, and
wherein the plurality of arrangement rules include at least:
a first arrangement rule for deciding on one of any of the areas with a table of random numbers;
a second arrangement rule for arranging the components in an order of size and discarding remaining components that do not fit due to lack of space; and
a third arrangement rule for expanding or reducing any of the areas relative to a peripheral area according to arrangement of the components.

7. The image generating method according to claim 6, wherein
the components include daily articles and wall objects; and
the daily articles and wall objects are arranged last.

8. The image generating method according to claim 6, wherein the components are arranged in each area based on a type of the area; and
the type is one of at least a corner, a wall, a center, and a ceiling.

9. The image generating method according to claim 6, wherein the characteristics includes at least tidy, untidy, deserted, and warehouse.

10. A computer-readable recording medium including a computer program for causing a computer to serve as an image generating device for generating an image of a component completed by arranging a plurality of components in a plurality of divided areas in a virtual three-dimensional space, the computer program causing the computer to serve as:
storage means for storing, in advance, data on the plurality of areas, data on the plurality of components, a first parameter indicating characteristics of the plurality of areas and directions in which the plurality of components are to be arranged in each area, and a second parameter indicating at least types and sizes of the plurality of components and environments where the plurality of components are to be arranged;
selection means for selecting, based on the characteristics of the plurality of areas included in the first parameter, one component from among the plurality of components for which the second parameter has been designated;
arranging means for arranging, based on the directions in which the plurality of components are to be arranged in each area included in the first parameter, the selected component in any of the areas using one or more of a plurality of arrangement rules; and
an imaging unit for generating image data to form the image of the component completed by arranging the selected component in any of the areas,
wherein each of the plurality of components is selected based upon at least one condition corresponding to a resident of the virtual space, and
wherein the plurality of arrangement rules include at least:
a first arrangement rule for deciding on one of any of the areas with a table of random numbers;
a second arrangement rule for arranging the components in an order of size and discarding remaining components that do not fit due to lack of space; and
a third arrangement rule for expanding or reducing any of the areas relative to a peripheral area according to arrangement of the components.

11. The computer-readable medium according to claim 10, wherein
the components include daily articles and wall objects; and
the daily articles and wall objects are arranged last.

12. The computer-readable medium according to claim 10, wherein the components are arranged in each area based on a type of the area; and
the type is one of at least a corner, a wall, a center, and a ceiling.

13. The computer-readable medium according to claim 10, wherein the characteristics includes at least tidy, untidy, deserted, and warehouse.

* * * * *